(12) United States Patent
Spicer et al.

(10) Patent No.: US 9,604,305 B2
(45) Date of Patent: Mar. 28, 2017

(54) QUALITY STATUS DISPLAY FOR A VIBRATION WELDING PROCESS

(71) Applicant: GM GLOBAL TECHNOLOGY OPERATIONS LLC, Detroit, MI (US)

(72) Inventors: John Patrick Spicer, Plymouth, MI (US); Jeffrey A. Abell, Rochester Hills, MI (US); Michael Anthony Wincek, Rochester, MI (US); Debejyo Chakraborty, Sterling Heights, MI (US); Jennifer Bracey, Holly, MI (US); Hui Wang, Highland, MI (US); Peter W. Tavora, Sterling Heights, MI (US); Jeffrey S. Davis, Grand Blanc, MI (US); Daniel C. Hutchinson, Goodrich, MI (US); Ronald L. Reardon, Fenton, MI (US); Shawn Utz, Washington Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 788 days.

(21) Appl. No.: 13/624,233

(22) Filed: Sep. 21, 2012

(65) Prior Publication Data
US 2013/0105557 A1  May 2, 2013

Related U.S. Application Data

(60) Provisional application No. 61/551,665, filed on Oct. 26, 2011.

(51) Int. Cl.
*B23K 31/00* (2006.01)
*B23K 31/02* (2006.01)
(Continued)

(52) U.S. Cl.
CPC ............ *B23K 20/10* (2013.01); *B23K 31/125* (2013.01)

(58) Field of Classification Search
USPC ............. 228/180.5, 4.5, 904, 110.1, 1.1, 111
See application file for complete search history.

(56) References Cited

U.S. PATENT DOCUMENTS 7,286,156 B2 * 10/2007 Saito et al. .................... 347/244
2003/0205684 A1 * 11/2003 Kitamura et al. ............ 250/580
(Continued)

FOREIGN PATENT DOCUMENTS

CN     101726504 A     6/2010
CN     102069293 A     5/2011

*Primary Examiner* — Erin Saad
(74) *Attorney, Agent, or Firm* — Quinn Law Group, PLLC (57) ABSTRACT

A system includes a host machine and a status projector. The host machine is in electrical communication with a collection of sensors and with a welding controller that generates control signals for controlling the welding horn. The host machine is configured to execute a method to thereby process the sensory and control signals, as well as predict a quality status of a weld that is formed using the welding horn, including identifying any suspect welds. The host machine then activates the status projector to illuminate the suspect welds. This may occur directly on the welds using a laser projector, or on a surface of the work piece in proximity to the welds. The system and method may be used in the ultrasonic welding of battery tabs of a multi-cell battery pack in a particular embodiment. The welding horn and welding controller may also be part of the system.

11 Claims, 3 Drawing Sheets

(51) Int. Cl.
 *B23K 20/10* (2006.01)
 *B23K 31/12* (2006.01)

(56) References Cited

U.S. PATENT DOCUMENTS

2007/0034313 A1   2/2007  Engelbart et al.
2010/0280646 A1* 11/2010  Hesse et al. .................. 700/110
2010/0326962 A1* 12/2010  Calla et al. ................ 219/76.14

* cited by examiner

QUALITY STATUS DISPLAY FOR A VIBRATION WELDING PROCESS

CROSS-REFERENCE TO RELATED APPLICATIONS

This application claims the benefit of U.S. Provisional Application Ser. No. 61/551,665, which was filed on Oct. 26, 2011, and which is hereby incorporated by reference in its entirety.

STATEMENT REGARDING FEDERALLY SPONSORED RESEARCH OR DEVELOPMENT

This invention was made with U.S. Government support under an Agreement/Project DE-EE0002217, Department of Energy Recovery and Reinvestment Act of 2009, Battery Pack Manufacturing B511. The U.S. government may have certain rights in this invention.

TECHNICAL FIELD

The present disclosure relates to the display of weld quality status in a vibration welding process.

BACKGROUND

The process of vibration welding involves the controlled application of high frequency vibration energy to a clamped work piece. Surface friction generates heat at a weld interface, which ultimately softens and bonds adjacent work piece surfaces at the interface. The efficiency, consistency, and long term reliability/durability of a vibration welded assembly depends largely on the welding tools and control methodology used to form the various welds.

Various closed-loop parameter-based control techniques are typically applied during a vibration welding process to keep certain weld parameters within calibrated limits. This approach can produce reasonably consistent welding parameters over time. However, stable welding process parameters may still fail to produce welds of a consistently high quality. In addition, external factors such as material quality can also impact weld quality. Moreover, a premature failure of just one weld can affect the performance of a welded system. It is therefore common practice in such systems to determine weld integrity by visual inspection and a laborious process known as picking, wherein each of the formed welds is physically tested by an operator using a picking tool.

SUMMARY

A vibration welding monitoring system and method are disclosed herein that can be used in conjunction with a vibration welding process. An example work piece whose manufacturing process may be enhanced by the present approach is a multi-cell battery module having a series of welded battery cell tabs. Such a battery module may be configured for use as a power source, e.g., for an electric traction motor aboard an electric, hybrid electric, or extended-range electric vehicle. While the present approach is not limited to weld process monitoring of battery cell tabs, the battery module described herein is representative of the type of system in which the present invention may have utility. Therefore, an example battery module is used throughout the remainder of this disclosure for illustrative consistency.

In particular, a system is disclosed herein that includes a host machine and a status projector. The host machine is in electrical communication with a collection of sensors that generates one or more sensory signals describing various aspects of the welding process, and with a welding controller that generates control signals for controlling the welding horn. The host machine processes the sensory and control signals to predict a quality status of welds that are formed using the welding horn, possibly including identifying any suspect welds. The host machine then activates the status projector to display the predicted quality status of the welds on or adjacent to the welds.

A method is also disclosed herein that includes receiving a set of sensory signals from the sensor(s) during formation of one or more welds on or within a work piece. The method also includes receiving control signals from a welding controller of the vibration welding system, with the control signals causing the welding horn to vibrate at a calibrated frequency. The host machine predicts the quality status of the various welds being formed. The predicted quality status is thereafter displayed on a surface of the work piece using the status projector.

Another system is disclosed that also includes the welding horn, the welding controller, and the collection of sensors.

The above features and advantages and other features and advantages of the present invention are readily apparent from the following detailed description of the best modes for carrying out the invention when taken in connection with the accompanying drawings.

DETAILED DESCRIPTION

Figure 1:
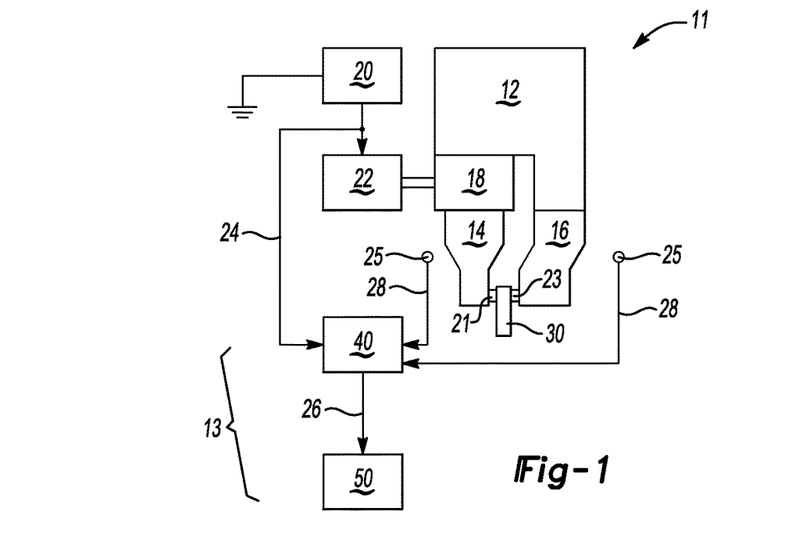
FIG. 1 is a schematic illustration of a monitoring system for a vibration welding process configured as disclosed herein.

Referring to the drawings, wherein like reference numbers refer to like components throughout the several Figures, a vibration welding system 11 is shown schematically in FIG. 1. The vibration welding system 11 includes a welding assembly 12 and a monitoring system 13. The monitoring system 13 is in communication with the welding assembly 12. Use of the monitoring system 13 is intended to improve production efficiency by substantially eliminating instances of false accepts during a vibration welding process, and by reducing the need for direct manual inspection or picking of every weld in a completed assembly.

The welding assembly 12 shown in FIG. 1 includes a sonotrode/welding horn 14 and an anvil 16, along with other welding tools and components as described below. The monitoring system 13 is configured to monitor various control signals provided by a power supply/welding controller 20 and/or measured by a collection of sensors 25 positioned with respect to the welding apparatus 12. The monitoring system 13 predicts, online and in real time, whether the welding assembly 12 has produced an objectively passing/good weld or a suspect weld. The suspect welds may then be subjected to direct end-of-line inspection, such as manual picking or other testing of the weld, to verify the presence of and isolate any unsatisfactory/bad welds. The verified bad welds may be marked and imaged as explained below with reference to FIG. 3.

Figure 3:
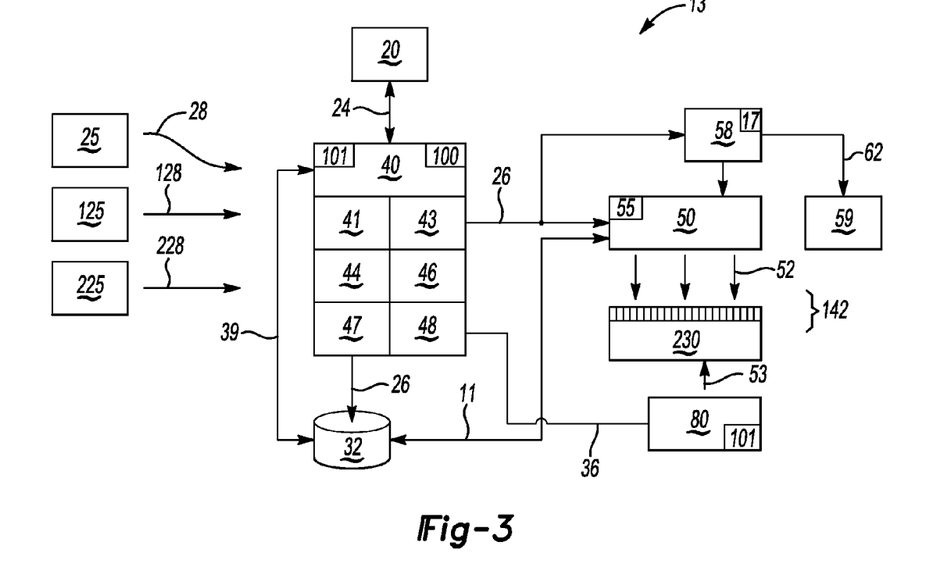
FIG. 3 is another schematic illustration of the monitoring system shown in FIG. 1.

The monitoring system 13 of FIG. 1 may include a status projector 50 and an optional display 59 (see FIG. 3). The status projector 50 interacts with a host machine 40 and a work piece 30 by illuminating any suspect welds. The status projector 50 may optionally highlight good welds. Such highlighting may be performed directly on the weld itself or on another surface of the work piece 30, for instance adjacent to the weld, upon formation of the welds. The structure and function of the status projector 50 is described in more detail below with reference to FIG. 3.

As will be understood by those of ordinary skill in the art, a welding controller/power supply used for vibration welding, such as the welding controller 20 of FIG. 1, may be electrically-connected to a suitable energy source, typically a 50-60 Hz wall socket. The welding controller 20 may include, for example, voltage rectifiers, transformers, power inverters, and/or other hardware which ultimately transforms the source power, whatever its form, into vibration control signals (arrow 24). The control signals (arrow 24) ultimately command predetermined waveform characteristic(s), for example a periodic signal having a frequency of about 20 kHz to about 40 kHz or more depending on the particular welding application. Other process information may be included in the control signals (arrow 24), including but not limited to power traces, displacement of the horn 14, vibration frequency, trigger signals, parameter limit alarms, weld controller fault information, etc., as is well understood in the art.

Still referring to FIG. 1, the welding system 11 may include a converter 22 having mechanical structure sufficient for producing a mechanical vibration of the horn 14 in response to the control signals (arrow 24). The horn 14 typically includes a knurl pattern 21, typically bumps and/or ridges, which are suitable for gripping and holding the work piece 30 when the work piece 30 is clamped between the horn 14 and anvil 16. The anvil 16 typically includes a similar knurl pattern 23. The welding system 11 of FIG. 1 may also include a booster 18, i.e., an amplifier, which increases the amplitude of any commanded mechanical vibration from the welding controller 20 as needed.

Within the monitoring system 13 shown in FIG. 1, the host machine 40 receives various signals from the sensors 25 positioned with respect to the welding assembly 12. The specific functionality and structure of the host machine 40 is described in greater detail below with reference to FIGS. 3 and 5. In general terms, the host machine 40 is a computer device in electrical communication with the welding controller 20. The host machine 40 is continuously apprised, via receipt of the control signals (arrow 24), of instantaneous values of any waveforms transmitted to the horn 14 by the welding controller 20, as well as of other values known by or internal to the welding controller 20. The collection of sensors 25 is "external" with respect to the internally-generated control signals (arrow 24) from the welding controller 20, and therefore is referred to hereinafter as the external sensors 25. The host machine 40 shown in FIG. 1 thus receives a set of external signals (arrows 28) from the external sensors 25 and internal control signals (arrow 24) from the welding controller 20. The host machine 40 then processes the signals (arrows 24, 28) to predict the quality of the weld being formed.

In an example embodiment, the host machine 40 may automatically extract a preliminary set of (n) signal features and map a predetermined number of the extracted signal features, or alternatively another feature which is determined as a function of the predetermined number of features, to a dimensional space having demarcated pass/suspect boundaries, a process referred to hereinafter as a box-void method. The host machine 40 then predicts the weld quality of the weld from the map. Other approaches may be used to predict quality of a weld without departing from the intended inventive scope, e.g., threshold comparisons, neural network processing, etc. Example extraction and mapping steps for a basic box-void method are described in detail below with reference to FIGS. 3 and 4.

However it is determined, the predicted weld quality may be provided as an output signal (arrow 26) to the status projector 50, whereupon the predicted quality of a given weld is visually indicated, e.g., via direct projection of a beam of light onto the work piece 30. The status display process is also described below with reference to FIG. 3.

Figure 2:
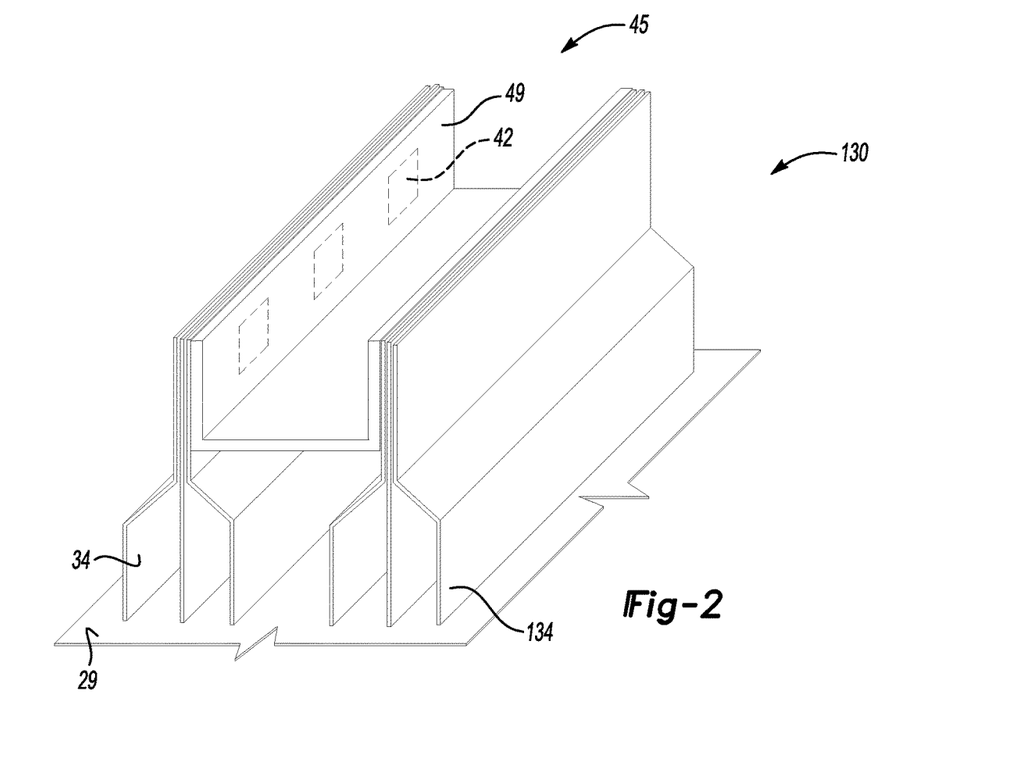
FIG. 2 is a schematic perspective view illustration of a portion of an example multi-cell battery module whose weld quality may be monitored and predicted in real-time via the monitoring system shown in FIG. 1.

Referring to FIG. 2, a non-limiting example embodiment of the work piece 30 of FIG. 1 is a multi-cell battery module 130 having an elongated conductive interconnecting member 45. For illustrative simplicity, only a portion of the battery module 130 is shown, however the battery module 130 as a whole may include an extended series of interconnecting members 45 arranged side by side in one or more rows. Each interconnecting member 45 joins oppositely-charged battery cell tabs 34, 134, of adjacent battery cells, with the battery cell tabs 34, 134 forming individual electrode extensions of a given battery cell.

Each cell tab 34, 134 is internally-welded, below an interconnect board 29 of the battery module 130, to the various anodes or cathodes comprising that particular battery cell, as is well understood by those of ordinary skill in the art. Multiple battery modules 130 may be arranged to form a complete battery pack of the type used to power an electric traction motor in a vehicle, or in other relatively high-power applications. The interconnecting member 45 may be constructed of a suitable conductive material, e.g., copper and/or nickel, to form a conductive rail for completing an electric circuit. Each interconnecting member 45 is positioned adjacent to the interconnect board 29 of the battery module 130.

The battery cell tabs 34, 134 extending from the interconnect board 29 may be ultrasonically welded to a longitudinal side wall 49 of a given interconnecting member 45, with substantially identical welds 42 formed at each interconnecting member 45 that is used in constructing the overall battery module 130. The high number of outwardly identical welds 42, e.g., on a series of substantially identical interconnecting members 45, is a structural feature that may be monitored effectively using the system 11.

Referring to FIG. 3, the present monitoring system 13 is described in greater detail as it may be used for predicting weld quality in a work piece 230, e.g., a multi-cell battery pack having an extended weld series 142 of outwardly identical welds. The host machine 40 may include a microprocessor/CPU 47 and a tangible, non-transitory memory device 48 possibly including read only memory (ROM), optical, and/or other magnetic memory. The host machine 40 may also include transitory memory, e.g., any required random access memory (RAM), electrically-programmable read-only memory (EPROM), etc.

Figure 5:
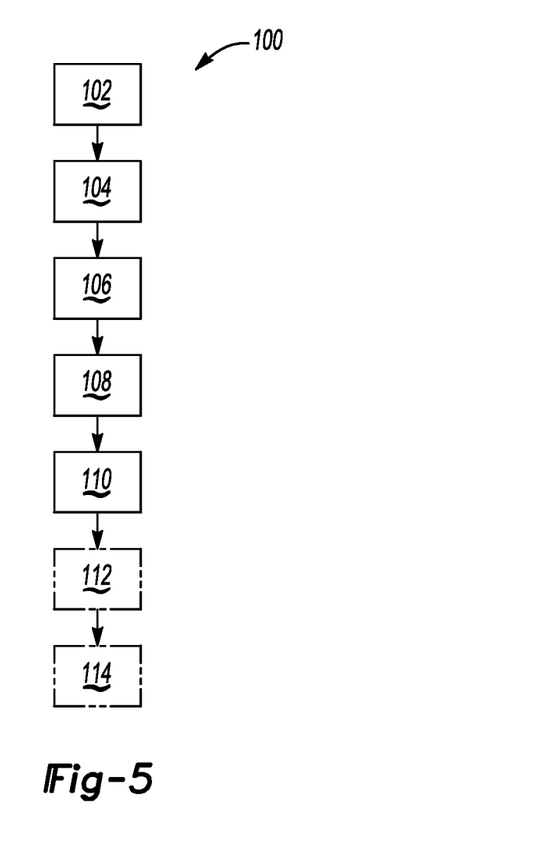
FIG. 5 is a flow chart describing an example method for monitoring and indicating weld quality in a vibration welding process.

The host machine 40 may include additional circuitry such as a high-speed clock (not shown), analog-to-digital circuitry, digital-to-analog circuitry, a digital signal processor, and the necessary input/output devices and other signal conditioning and/or buffer circuitry. The host machine 40 is configured to execute process instructions embodying the present method 100, an example of which is shown in FIG. 5, from the memory device 48.

The host machine 40 of FIG. 3 may receive the control signals (arrow 24) from the welding controller 20 and other signals (arrows 28, 128, 228) from the external sensors 25, 125, and 225, respectively. As part of the control signals (arrow 24), the welding controller 20 may provide certain historical information such as welding power over time, welding frequency over time, and other possible waveforms or values, as well as peak values, slopes, areas, area ratios, moving averages, and the like.

In an example embodiment, one external sensor, e.g., the sensors 25, may be configured as an acoustic sensor, for instance a microphone or an acoustic emission sensor positioned in direct contact with a surface of a welding tool, e.g., the horn 14 of FIG. 1. The sensors 25 may measure the acoustic frequency of the vibrating horn 14 of FIG. 1 over time, with this value used by the host machine 40 as a base signal from which features may be extracted and modeled. Another example external sensor 125 may measure a changing linear displacement of the horn 14 of FIG. 1 over time. Yet another example external sensor 225 may be used to detect any other desirable value, such as changing welding temperature and/or other atmospheric information such as relative humidity that might affect weld quality. Each collection of sensors 25, 125, 225 may include one or more individual sensors as noted above.

The host machine 40 shown in FIG. 3 may include a recorded feature library 41. The CPU 47 processes the control signals (arrow 24) and the external signals (arrows 28, 128, 228) into one or more of the features that are contained in the recorded feature library 41. A preliminary set of signal features may be extracted, i.e., calculated or otherwise derived, for instance as a function of the base power, frequency, displacement, and acoustic signals provided from the welding controller 20 and/or from the various sensors 25, 125, or 225. The extracted features may be mapped as set forth below, or some/all of the extracted features may be combined to form another signal feature which is mapped.

Some non-limiting example extracted features include the total welding energy, i.e., the area under a power curve or input waveform commanded from the welding controller 20. Other extracted features may include the elapsed time in forming a given weld in the weld series 142, peak power, rise time, ramp rate, or even correlation data, for instance between the acoustic signal and the power signal. Any number of desired features may be extracted and used, either directly as extracted or indirectly by calculating a derived signal feature as a function of the extracted features, without departing from the intended inventive scope. However, as explained below, the more features that are extracted and used, the more complex the dimensional space needed for mapping these features, thus requiring more processing power.

The host machine 40 may also include a mapping module 43. The mapping module 43 includes computer-executable instructions, executable via the CPU 47, for processing the extracted features so as to identify the best subset of features that separates a good weld from a suspect weld. The mapping module 43 may also determine suitable upper and/or lower limits for any monitored features.

Figure 4:
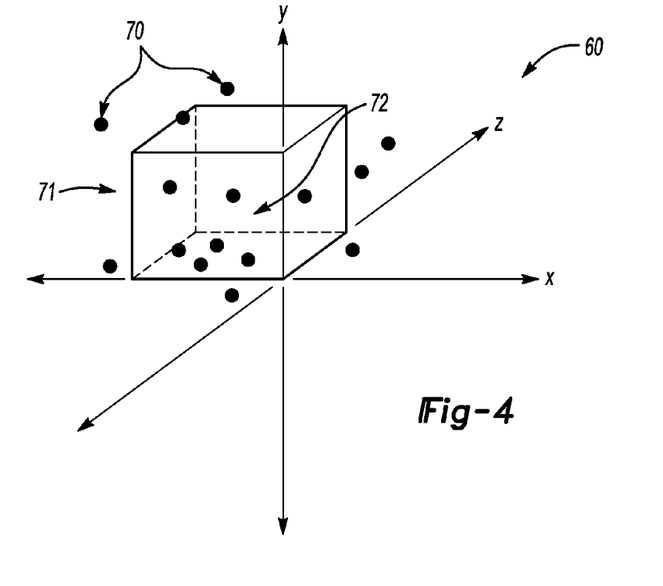
FIG. 4 is an example diagram of a mapped set of extracted features in multiple dimensions.

Referring briefly to FIG. 4, an example dimensional space 60 is shown as a simplified illustrative embodiment of an output generated, in the box-void method noted above, using the mapping module 43 shown schematically in FIG. 3. Various data points 70 are plotted, with each data point 70 representing a formed weld. Here, three features (n=3) are used to create an example three-dimensional space. As noted above, n features can be used to produce an n-dimensional space, although the n-features may be combined to form a number of signal features that may be less than n. Therefore, there may be a tradeoff between the number of extracted features and the resultant complexity of the processing steps undertaken by the mapping module 43 and CPU 47. Each dimension/axis x, y, and z shown in FIG. 4 corresponds to a separate feature, with the location of a given data point 70 described by its location with respect to each of the axes. No other spatial meaning is attributed to these particular designators.

A data point 70 corresponding to the feature set of a given weld is mapped to a dimensional space, e.g., the space 60, by the mapping module 43. Thus, each data point 70 in the 3D space example of FIG. 4 is defined by a triplet [x, y, z] in the three-feature example of the same Figure. Using arbitrary designations for additional axes, a four-axis example could be defined by a set [x, y, z, q], etc. The mapping module 43 of FIG. 3 may access the recorded feature library 41, information stored in memory device 48, and/or may otherwise determine calibrated limits for each feature. The upper/lower limits define the boundaries of the dimensional space 60, e.g., the cube 71 or a less/more complex geometric shape in other embodiments mapping fewer/more than three features, respectively. It is also possible that each feature is bounded in only one direction, for instance having a lower limit with no upper limit or vice versa.

Referring again to FIG. 3, the host machine 40 may also include a training library 44. One may train the host machine 40 to recognize good and suspect welds by preloading previously-validated good and suspect data points 70 (see FIG. 4). These data points 70 can also be used to set the boundaries of the dimensional space used by the mapping module 43. The feature library 41 may include all of the data points 70 of FIG. 4 in the training library 44, or only some of these points. For example, if the corresponding weld quality of certain data points 70 is not known but may be knowable over time given a sufficient number of additional similar samples, the data points 70 of unknown quality may continue to reside in the training library 44 for some time until they are validated. Once validated, a new data point 70 in the training library 44 may be used to update the boundaries of the dimensional space.

The monitoring system 13 shown in FIG. 3 may also include a quality prediction module 46. Referring again to FIG. 4, the quality prediction module 46 of FIG. 3 may be embodied as a set of computer-executable instructions, recorded in memory device 48 and executable via the CPU 47, for comparing the location of a given data point 70 to the limits or boundaries of the dimensional space, e.g., the cube 71. If a data point 70 lies outside of the cube 71, the quality prediction module 46 of FIG. 4 may designate these data points 70 as corresponding to a suspect weld. Likewise, if a data point 70 lies within the cube 71, such as in the case of the data points 72, the quality prediction module 46 may designate this data point 70 as corresponding to a good weld.

Referring again to FIG. 3, as will be understood in the art, various tracking technologies exist which enable identification and tracking of a component as it moves through various production stages, for instance RFID tagging, such that the host machine 40 of FIGS. 1 and 3 may be informed as to the identity of the particular weld that is currently being formed. This allows the good/suspect status for each weld to be accurately tracked regardless of the number of welds formed before or after formation of that particular weld.

As noted above, the host machine 40 transmits a quality output signal (arrow 26) which captures the status of a weld. Such a signal may be output by the quality prediction module 46 described above. The output signal (arrow 26) may be transmitted to a programmable logic controller (PLC) 58, with the good/suspect status viewable in real time by production operators via an associated human-machine interface (HMI) 17, or captured and recorded in a database 32. The PLC 58 is in two-way communication with the host machine 40, e.g., via a data bus (not shown). The HMI 17 may be a touch-screen display so as to facilitate direct user interaction with the host machine 40, the status projector 50, the display 59, and/or a camera 80 that executes image processing instructions 101, and that is in communication with the host machine 40 over a bus 36, or otherwise in communication with database 32.

The database 32 of FIG. 3 is shown as a single device for simplicity. However, the database 32 may be embodied as a distributed database management system. For instance, the database 32 may be embodied as a data server storing a calibrated number of signal files from the external sensors 25, 125, 225 and/or the welding controller 20, a data acquisition/DAQ database, a structured query library/SQL database containing metadata and quality data for a calibrated time period, etc. Any data in the database 32 may be extracted by the host machine 40, as is indicated by double-headed arrow 39.

The host machine 40 of FIG. 3 may also transmit the output signal 26 status to the status projector 50 and PLC 58. As described above, certain types of work pieces, such as an assembled battery module 230 shown schematically in FIG. 3, include a lengthy series of outwardly identical welds. These are collectively illustrated as a weld series 142. Each weld in the weld series 142 is typically manually inspected in a laborious picking process after weld formation, wherein the various welds are physically pulled or prodded with a picking tool to stress the weld and thus directly verify weld quality. Use of the status projector 50 may help minimize the amount of time spent and ergonomic stresses of manually picking welds in the battery module 230, and may facilitate or expedite the minimal picking of suspect welds that still occurs.

Specifically, the status projector 50 includes a processor 55. The projector 50 displays status information using one or more light beams (arrows 52) by projecting the light beams (arrows 52) onto a surface, for instance on or adjacent to the work piece 230 on or adjacent to suspect welds in the weld series 142. The status projector 50 may be embodied as a conventional light projector, or as a laser projector which projects concentrated or collimated beams of visible or other wavelengths of light as explained below.

The processor 55 receives the output signal (arrow 26) from the PLC 58 and/or from the host machine 40. The output signal (arrow 26) may include the associated identifying information such as the serial number of the battery module 230 and identifying information for each weld in the weld series 142. The processor 55 then projects a light beam(s) (arrows 52) onto or adjacent to a weld. Optionally, display 59 may be placed in communication with the PLC 58 and positioned with respect to the work piece 230, with text or other information (arrow 62) from the PLC 58 presented via the display 59, such as the weld status, serial number of the work piece 230, alert messages, status information, etc.

For instance, a light beam (arrows 52) may be projected onto a portion of the example interconnecting member 45 of FIG. 2, or onto the weld 42 that is deemed to be suspect. The status projector 50, when configured as an optional laser projector, may use a red/green/blue (RGB) laser projector to project a specific color laser indicating the suspect welds, or a gas laser with a switched color filter. The color of the beam should provide sufficient contrast with the materials onto which the light beam 52 is directed, with optional mixing of the beams (arrows 52) enabling use of colors such as yellow, magenta, cyan, etc.

Using the light beams (arrows 52) in this manner, line operators may be visually queued to the suspect welds. Other embodiments may be conceived, such as coating work piece surfaces, such as the interconnecting member 45 of FIG. 2, with a fluorescent layer and using ultraviolet light rather than visible light as the light beams (arrows 52). Visible light is then emitted from the irradiated surfaces similar to approaches used in certain heads up display (HUD) systems.

An example method 100 is shown in FIG. 5. The method 100 may be embodied as computer-executable instructions that are executed by the host machine 40 of FIG. 3 and other components of the monitoring system 13 to monitor weld quality in a welded assembly, e.g., the example battery module 130 of FIG. 2.

Beginning with step 102, the work piece 30 of FIG. 1 is clamped into position between the horn 14 and the anvil 16, and calibrated vibrations are applied to the clamped work piece 30.

As step 102 is executed, the power supply 20 and the external sensors 25 measure certain parameters and environmental data at step 104, with this information being relayed to and recorded by the host machine 40.

At step 106, the host machine 40 processes the received data, i.e., the control signals (arrow 24) and the external signals (arrows 28) of FIG. 1, and predicts the quality of the weld being formed. Step 106 may entail execution of the box-void method noted above, or any other predictive approach, including possibly threshold parameters comparisons, neural network processing, and the like. Once the predicted quality of a given weld is recorded, the method 100 proceeds to step 108.

At step 108, the quality status is displayed on or adjacent to the welds of the work piece using the status projector 50, e.g., by projecting light beams (arrows 52) directly onto the welds from overhead or onto part of the interconnecting member 45 shown in FIG. 2. The light beams (arrows 52) visually highlight or indicate the suspect welds 42 directly on or adjacent to the welds 42. The method 100 then proceeds to step 110.

At step 110, an inspector may manually pick the welds 42 that are indicated as being suspect at step 108. The inspector may then records the locations of the welds 42 that are in fact unsatisfactory/bad, either as part of step 110 or by proceeding to optional step 112.

At optional step 112, as shown in phantom, the inspector may physically mark the confirmed bad welds from step 110. Step 112 may entail physically placing stickers, imprints, paint, or any other suitable marker. The marker may be placed over or next to a confirmed unsatisfactory weld. As accurate identification of the weld locations is essential, the markers used in step 112 should be designed in such a way that the position of the placed marker can be readily and accurately determined via operation of the camera 80 and the image processing instructions 101, even under varying lighting conditions. Likewise, the work piece, e.g., a battery section, should be located consistently in the field of view (arrow 53) of the camera 80 to ensure that the locations of the welds are determined accurately. Alternatively, additional visual locating features can be added to the battery section to make locating of the part more accurate for the image processing instructions 101. The method 100 then proceeds to optional step 114.

At optional step 114, the camera 80 may be used to image any marked bad welds 42 by executing the instructions 101. The captured images of the confirmed bad welds are processed by executing the instructions 101. Processing may include identifying the locations in or on the work piece of each confirmed bad weld, e.g., by comparing the location of the imaged markers to a baseline/calibrated image or using other position or pattern recognition techniques. The locations of the unsatisfactory welds may be recorded in the database 32 for use by a repair technician in a subsequent repair operation.

The repair technician may be restricted to updating of the repair status only of the unsatisfactory welds. For instance, the HMI 17 of the PLC 58 or another HMI may display the unsatisfactory weld locations and/or images of these welds instead of displaying all of the welds and allowing the technician to pick from a list of all welds. Given the number of welds in the weld series 142, restriction of data entry to only confirmed unsatisfactory welds may reduce errors, such as by selecting the wrong weld location from a global list. If other positions require data entry, a warning message may be given to the repair person requesting manual confirmation of the position.

Communication may be made with the PLC 58 to indentify when a particular weld 42 has been identified for repair. Any such image displayed on the HMI 17 or other display should be taken such that buttons on the touch screen of HMI 17 properly with the location of weld positions in the image. This alignment can help ensure that image processing software of projector 50 or another device can confirm that the inspector/repair person is selecting the correct weld position when entering data on bad welds. Information on bad welds may be fed automatically via the HMI 17 to the host machine 40 of FIG. 1 to improve estimation/prediction results over time.

While the best modes for carrying out the invention have been described in detail, those familiar with the art to which this invention relates will recognize various alternative designs and embodiments for practicing the invention within the scope of the appended claims.

The invention claimed is:

1. A system comprising:
   a host machine having a processor and tangible, non-transitory memory on which is recorded instructions for predicting a quality status of welds formed via a vibration welding process, wherein the host machine is in electrical communication with a collection of sensors and a welding controller; and
   a status projector in communication with the host machine, wherein the status projector is operable to selectively illuminate at least some of the welds to thereby indicate the predicted quality status of the illuminated welds;
   wherein the host machine is configured to execute the instructions using the processor to thereby:
   receive and process signals from the sensors and the welding controller;
   predict the quality status of each of the welds; and
   display the predicted quality status of the welds, on or adjacent to the welds, by illuminating the welds via the status projector.

2. The system of claim 1, wherein the status projector includes a laser projector that illuminates the welds using a laser beam to display the predicted quality status.

3. The system of claim 2, wherein the host machine predicts the quality status in part by predicting which of the welds are suspect welds, and wherein the laser projector projects the laser beam directly onto or immediately adjacent to the suspect welds.

4. The system of claim 3, wherein the laser projector is one of a red, green, blue laser projector and a gas laser having a switched color filter.

5. The system of claim 3, wherein the laser projector is an ultraviolet light projector.

6. The system of claim 1, wherein the host machine is configured to map a predetermined number of signal features from the signals to a dimensional space having a number of dimensions that is equal to the predetermined number.

7. The system of claim 1, further comprising a camera, wherein the camera is configured to image and identify the location of a physical marker positioned with respect to some of the welds.

8. A system comprising:
   a welding horn;
   a welding controller that generates control signals for controlling the welding horn in a vibration welding process in which at least one weld is formed on or within a work piece;
   a collection of sensors positioned with respect to the welding horn, wherein the sensors are configured to generate sensory signals describing a quality of the vibration welding process;
   a status projector positioned with respect to the work piece; and
   a host machine in electrical communication with the sensors and with the welding controller, wherein the host machine is configured to execute instructions from tangible, non-transitory memory to thereby:
   process the sensory and control signals;
   predict, using the sensory and control signals, a quality status of the at least one weld being formed using the welding horn, including identifying any suspect welds;
   illuminate the identified suspect welds to indicate the quality status via the status projector;
   recording an image of a marker positioned with respect to the illuminated suspect welds; and
   recording the position of each marker in memory of the host machine.

9. The system of claim 8, wherein the work piece is a multi-cell battery having a conductive interconnecting member to which battery tabs are connected via the at least one weld, and wherein the status projector includes a laser projector that projects a beam of visible light directly onto the identified suspect welds or onto the interconnecting member adjacent to the identified suspect welds.

10. The system of claim 9, wherein the laser projector is one of a red, green, blue laser projector and a gas laser with a switched color filter.

11. The system of claim 8, wherein the host machine is configured to map a predetermined number of signal features from the sensory and control signals to a dimensional space having a number of dimensions that is proportional to the predetermined number.

* * * * *